Oct. 11, 1927.
R. NORDENSWAN ET AL
1,644,789
ELECTROMAGNETIC DEVICE
Filed May 17, 1924
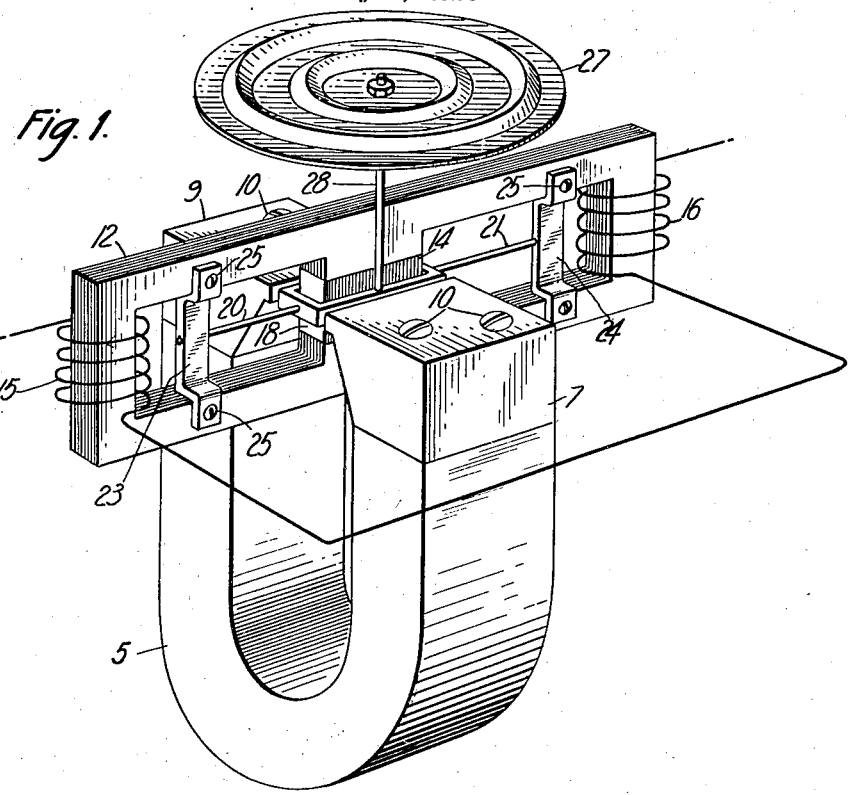
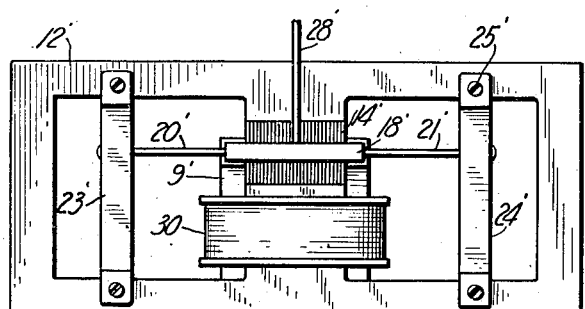
Inventors:
Robert Nordenswan
Alfred S. Curtis
by ─────── Att'y.

Patented Oct. 11, 1927.

1,644,789

UNITED STATES PATENT OFFICE.

ROBERT NORDENSWAN AND ALFRED S. CURTIS, OF NEW YORK, N. Y., ASSIGNORS TO WESTERN ELECTRIC COMPANY, INCORPORATED, OF NEW YORK, N. Y., A CORPORATION OF NEW YORK.

ELECTROMAGNETIC DEVICE.

Application filed May 17, 1924. Serial No. 713,900.

This invention relates to electromagnetic devices, and is particularly, although not exclusively, useful in connection with telephone receivers of the loud speaking type.

The general object of the invention is to provide a new and improved arrangement which will be efficient and satisfactory in operation, and will possess certain advantages hereinafter mentioned.

Generally speaking, the invention is characterized by a magnet providing a steady magnetic field across a gap, a transformer having a core a portion of which is located within said gap, the secondary winding of said transformer being short circuited and movably arranged in said gap, the laminations in the transformer core being so arranged as to provide paths of high permeability at high flux densities for substantially all of the magnetic flux passing across the gap in which the movable secondary winding is located.

The invention will be understood from the following description, taken in connection with the accompanying drawing, in which are described certain forms in which the invention may be embodied. In the drawing, Fig. 1 is a perspective view, somewhat diagrammatic in character, showing the principal parts of a telephone receiver having the invention embodied therein; and Fig. 2 is an elevation, partly insection, showing a modification of the embodiment of the invention illustrated in Fig. 1. Like parts are referred to throughout the specification and drawing by the same or similar reference characters.

Referring to Fig. 1, a permanent magnet 5 of the horseshoe type is shown as provided with pole pieces 7 and 9 which may be secured to the magnet 5 by screws 10 or in any other suitable manner. The form of the pole pieces 7 and 9 will be apparent from the drawing from which it will be evident that there is provided between them a gap containing a substantially steady magnetic field. It will of course be understood that an electromagnet, energized by any constant source of direct current, may be used instead of the permanent magnet 5, for furnishing the steady magnetic flux across the gap between the pole pieces 7 and 9.

As shown in Fig. 1, the device is provided with a transformer having a closed magnetic circuit a portion of which is located in the gap between the pole pieces 7 and 9. The core of this transformer is laminated, but is unique in that the laminations in the portion 12, outside of the gap between the pole pieces 7 and 9, are arranged substantially perpendicular to the lines of steady magnetic flux across said gap; while the laminations in the portion 12 of the transformer core which is located in said gap, are arranged perpendicular to the laminations in the portion 12 of the core and substantially parallel to the lines of force in the steady magnetic field across said gap. With this arrangement, it will be apparent that paths of high permeability are provided, not only for the flux due to the alternate current in the transformer, but also for the steady magnetic flux produced by the magnet 5 across the gap between the pole pieces 7 and 9.

In Fig. 1, the transformer is shown as provided with two primary windings 15 and 16 connected in series and so wound as to cause their resultant magnetic flux to pass through the portion 14 of the transformer core which is located in the gap between the pole pieces 7 and 9 of the magnet 5. The secondary coil of the transformer consists of a single short circuited turn 18 of copper, aluminum or some other metal which has a low electrical resistance for a given mass. As shown, the coil 18 is of rectangular form, and surrounds the portion 14 of the transformer core which is located in the gap between the magnet pole pieces 7 and 9, sufficient clearance being allowed between said coil and said core and said pole pieces to permit movement of said coil. The coil 18 is shown as pivotally supported by spindles 20 and 21 which extend from opposite ends thereof and are journaled in any suitable support, such as straps 23 and 24 of brass or other substantially nonmagnetic material of the form shown, attached by screws 25 to the portion 12 of the core of the transformer. While the device so far described may have other uses, it is particularly adapted for use in a telephone receiver having a diaphragm 27 which at its center is mechanically connected by a rod 28 with one side of the movable secondary coil 18 of the transformer. As the coil 18 is caused to vibrate, by variations in the talking current traversing the primary windings 15 and 16, its movement is transmitted through the rod 28 to the receiver diaphragm 27, resulting in the production of sound, in a manner well understood by those skilled in the art. It will be obvious that the diaphragm 27 and the other parts of the device may be suitably supported by a casing which need not be shown since it forms no part of the present invention.

The form of the invention shown in Fig. 2 is similar to that shown in Fig. 1, except for the fact that a single primary winding 30 is employed, and this winding is mounted upon the middle porton of the transformer core below the gap in which the short circuited secondary coil is mounted. The permanent magnet 5' is similar to the permanent magnet shown in Fig. 1, and is provided with pole pieces similar to those shown in Fig. 1, one of such pole pieces being shown at 9'. The laminations in the portion 12' of the transformer core outside of the gap between the pole pieces, are arranged substantially perpendicular to the steady flux in the gap; and that portion 14' of said core which lies within the gap, has its laminations arranged substantially parallel with the steady flux in said gap, in the same manner as in the device shown in Fig. 1. The secondary winding 18', which surrounds the portion 14' of the transformer core, is pivotally supported by spindles 20' and 21' journaled in straps 23' and 24' secured to the transformer core by screws 25'. The receiver diaphragm is not shown in Fig. 2, but it will be understood that it is mechanically connected to the coil 18' by the rod 28'.

The mode of operation of the above described telephone receivers embodying the invention, will be obvious. With variations in the talking current in the primary windings 15—16 or 30, varying currents are induced in the secondary winding 18 or 18', with the result that said secondary winding is caused to vibrate in the steady magnetic field produced by the magnet 5 or 5'. This vibratory movement of the coil 18 or 18' is transmitted to the receiver diaphragm 27, with the resultant production of sound in a well-known manner.

One of the advantages of a receiver of this type resides in the fact that it may be designed for the handling of large amounts of energy, as the space available for the primary windings is large, and the weight of the latter is not an important factor. Owing to the arrangement of the laminations in the two parts of the transformer core, a path of high permeability for the steady flux is provided across the gap between the pole pieces of the permanent magnet, and at the same time the permeability of other paths for this steady flux through the transformer core is made comparatively high. Moreover, this result is attained without seriously affecting the permeability of the transformer core as far as magnetic flux due to the talking current is concerned. Owing to the fact that the moving coil consists of only a single turn, which does not require insulation, it can be operated considerably hotter than would ordinarily be possible with a coil of a number of turns. Furthermore, the movable coil may be made sufficiently strong to support itself; and its electrical resistance may be decreased by making its ends of a larger cross section than its sides, without a proportionate increase in the effective mass of the coil. The movable element of the device may, therefore, be made comparatively strong mechanically and of high current carrying capacity; and its motion may be transmitted to the diaphragm without serious distortion of the coil. It will also be apparent that the air gaps existing in the circuit threaded by the steady flux may be made very short.

Other advantages obtained by the invention above described will be apparent to those skilled in the art, and it will be understood that the embodiments of the invention herein shown are merely illustrative, and that many modifications may be made without departing from the spirit of the invention as defined in the following claims.

What we claim is:

1. In an electromagnetic device, a magnet structure having a gap therein, a laminated transformer core forming a closed magnetic circuit a portion of which is located in said gap, said portion having laminations parallel to the lines of force in said gap, a primary winding on said core, and a short circuited secondary winding for said transformer movably mounted in said gap.

2. In an electromagnetic device, a magnet structure having a gap containing a steady magnetic field, a transformer having an H-type laminated core forming a closed magnetic circuit a portion of which is located in said gap, a primary winding on said core, and a short circuited secondary winding for said transformer movably mounted in said gap.

3. In an electromagnetic device, a magnet structure having a gap containing a steady magnetic field, a transformer having an H-type laminated core forming a closed circuit the central portion of which is located in said gap, the laminations in the last mentioned portion of the core being arranged parallel with the lines of force in the steady magnetic field, a split primary winding on said core, and a short circuited secondary winding for said transformer movably mounted and surrounding the portion of the transformer core which is located in said gap.

4. In an electromagnetic device, a magnet providing a steady magnetic field across a gap, a transformer having a laminated core a portion of which is located in said gap, the laminations in the last mentioned portion of the core being arranged perpendicular to the laminations in the rest of the core and parallel with the lines of force of the steady magnetic field, a primary winding on said core, and a short circuited secondary winding for said transformer movably mounted and surrounding the portion of the transformer core which is located in said gap.

5. In an electromagnetic device, a magnet providing a steady magnetic field across a gap, a transformer having a laminated core a portion of which is located in said gap, the laminations in the portion of the core outside of said gap being substantially perpendicular to the lines of force in the steady magnetic field, and the laminations of the portion of the core within said gap being substantially perpendicular to the other laminations and parallel with the lines of force in the steady magnetic field, a primary winding on said core, and a short circuited secondary winding movably mounted and surrounding the portion of transformer core which is located in said gap.

6. An electromagnetic device having a laminated core in which the laminations in one portion are perpendicular to the laminations in another portion, and separate means for producing in one of said portions two flux streams perpendicular to each other and in the plane of laminations in such portion.

In witness whereof, we hereunto subscribe our names this 16 day of May, A. D. 1924.

ROBERT NORDENSWAN.
ALFRED S. CURTIS.